June 28, 1932. T. FOOTE 1,865,365
ADJUSTABLE TRACTOR PLATFORM
Filed Oct. 19, 1931
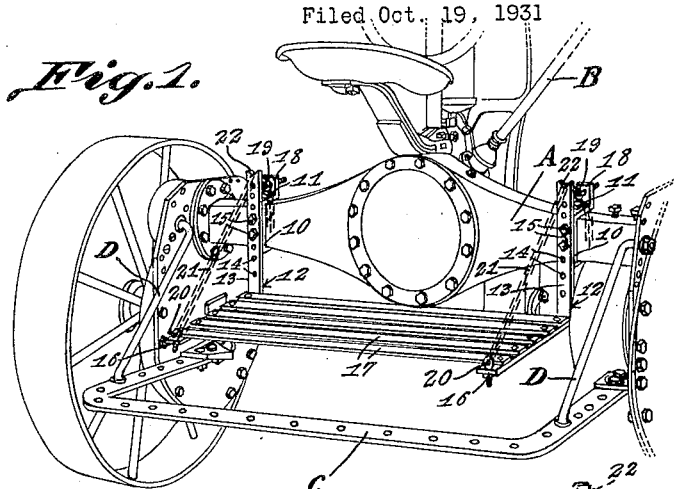
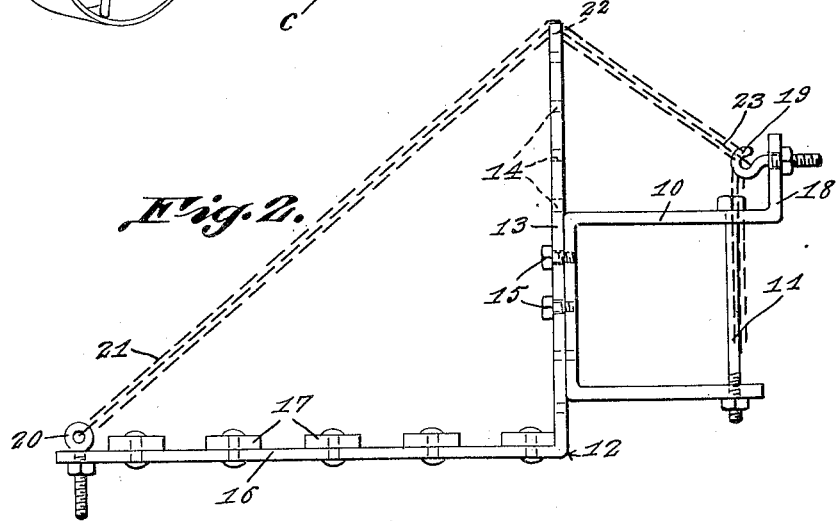
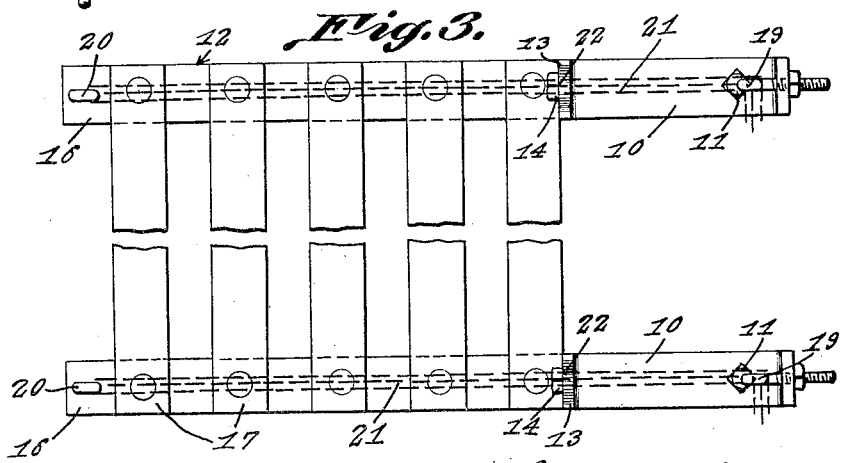
Theodore Foote, INVENTOR
BY Victor J. Evans and Co.
ATTORNEY Patented June 28, 1932

1,865,365

UNITED STATES PATENT OFFICE

THEODORE FOOTE, OF PILGER, NEBRASKA

ADJUSTABLE TRACTOR PLATFORM

Application filed October 19, 1931. Serial No. 569,788.

The invention relates to a platform construction and more especially to an adjustable tractor platform.

The primary object of the invention is the provision of a platform of this character wherein in its construction the same can be readily and conveniently mounted upon the rear end of a tractor and adjusted for the convenience of the operator so as to enable the said operator to control the tractor when occupying the platform or for easy access to the seat of the tractor and also for leaving the same.

Another object of the invention is the provision of a platform of this character, wherein the same is novel in form and is adjustable to assure the proper mounting thereof and positioning of the same upon a tractor.

A further object of the invention is the provision of a platform of this character which is extremely simple in construction, thoroughly reliable and efficient in its purpose, light of weight yet possessing the required strength, durability and inexpensive to manufacture and install.

With these and other objects in view the invention consists in the features of construction, combination and arrangement of parts, as will be hereinafter more fully described in detail, illustrated in the accompanying drawing which discloses the preferred embodiment of the invention, and pointed out in the claims hereunto appended.

In the accompanying drawing:

Figure 1 is a fragmentary perspective view of the rear end portion of a tractor of standard construction, showing a platform constructed in accordance with the invention applied thereto.

Figure 2 is a side elevation of the platform detached from the tractor.

Figure 3 is a top plan view.

Similar reference characters indicate corresponding parts throughout the several views in the drawing.

Referring to the drawing in detail, A designates generally the transmission housing of a tractor, the same being of the ordinary well known construction, B the gear shift lever, while extending rearwardly from the housing A is a draw bar C, the latter being supported by braces D, these being of standard construction.

Adapted to be attached to the housing A is the adjustable platform constituting the present invention and in association therewith is a pair of substantially U-shaped clips 10, these being adapted to accommodate the housing A, with each clip extending over the top, rear and bottom of said housing. The clips are secured in place through the medium of not carrying bolts 11 so that said clips are made firm and secure upon the housing.

The platform comprises a pair of substantially L-shaped brackets 12, these in their upstanding limbs 13 have formed therein spaced holes 14 selectively engaged by bolts 15, the same being adapted for detachable engagement in the clips 10 and thus in this manner the said brackets 12 are adjustably carried thereby.

The outstanding horizontal portions 16 of the brackets 12 have riveted or otherwise secured thereto spaced parallel slats 17, these constituting the base of the platform.

The clips 10 are formed with upstanding ears 18 in which are adjustably engaged hooks 19, while secured in the outer ends of the outstanding horizontal portions 16 of the brackets 12 are eyes 20 with which are connected chain lengths 21, the same being trained through notches 22 formed in the free ends of the upstanding portions 13 of the brackets 12 for the engagement of these chain lengths by selective links 23 thereof with the hooks 19, thus it being seen that the said chain lengths 21 constitute braces for the platform when mounted upon the transmission housing A of the tractor.

The brackets 12 are susceptible of adjustment on the clips 10 and correspondingly the chain lengths 21 can be adjusted by selectively engaging the links 23 thereof with the hooks 19 as will be apparent.

Under the adjustment of the platform it can be positioned at the required elevation and is useful to an operator of the tractor either for access to the seat of the tractor or for the occupancy of such platform in the operation of the tractor.

Having described the invention, I claim:

1. A platform of the kind described, comprising a pair of clips adapted to be secured to a transmission housing of a tractor and having perforated vertical portions and hooks on the clips and rearwardly of said vertical portions, substantially L-shaped brackets, means adjustably connecting the brackets with the clips and selectively engageable in the perforations therein, slats carried by the brackets and chains connected with the brackets at lowermost points thereof and trained over the vertical portions and engageable with the hooks.

2. A platform of the kind described, comprising a pair of clips adapted to be secured to a transmission housing of a tractor and having perforated vertical portions and hooks on the clips and rearwardly of said vertical portion substantially L-shaped brackets, means adjustably connecting the brackets with the clips and selectively engageable in the perforations therein, slats carried by the brackets and chains connected with the brackets at lowermost points thereof and trained over the vertical portions and engageable with the hooks and said brackets at their uppermost points being provided with seats for said chains.

In testimony whereof I affix my signature.

THEODORE FOOTE.